Patented Feb. 7, 1950

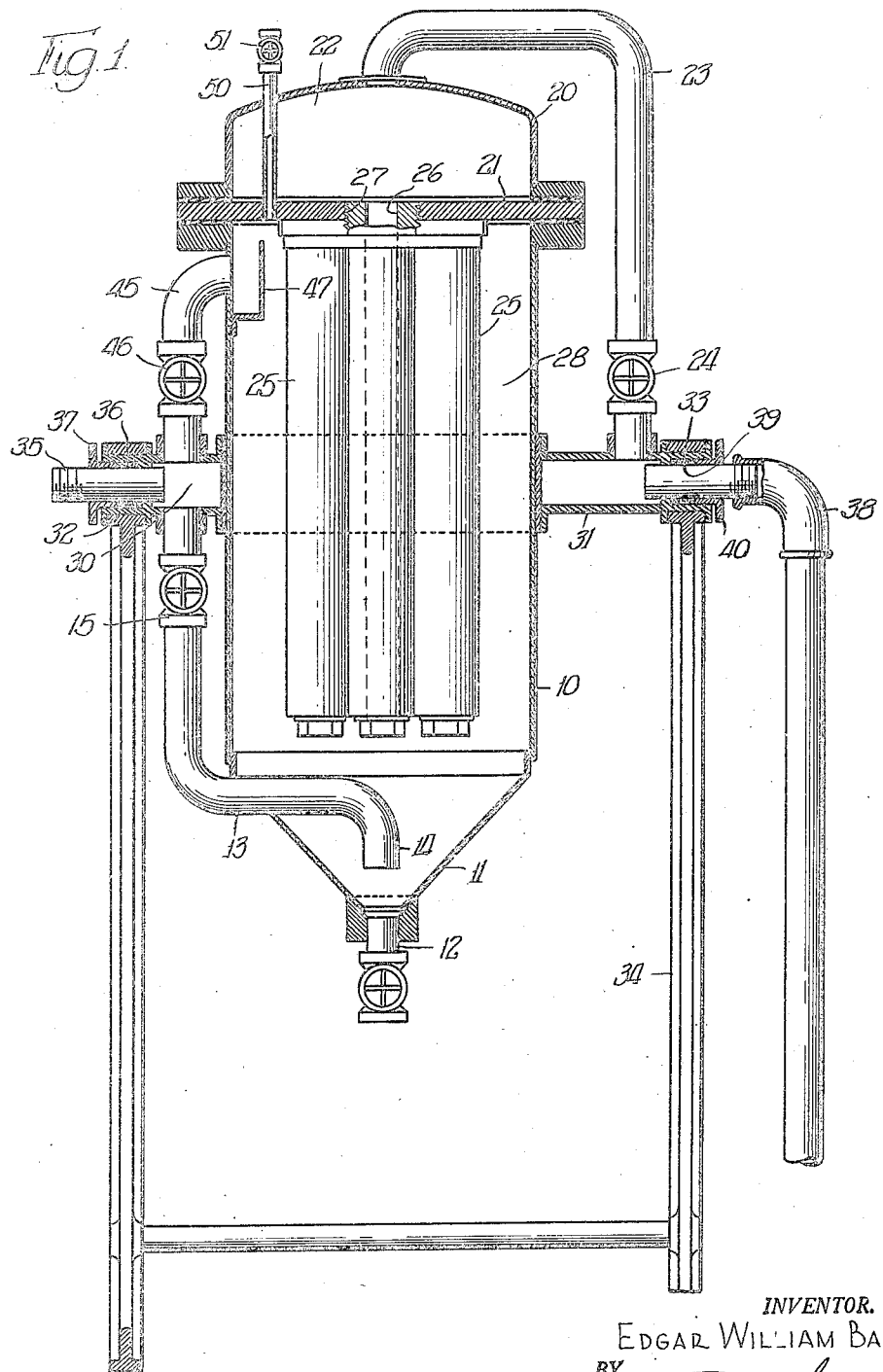

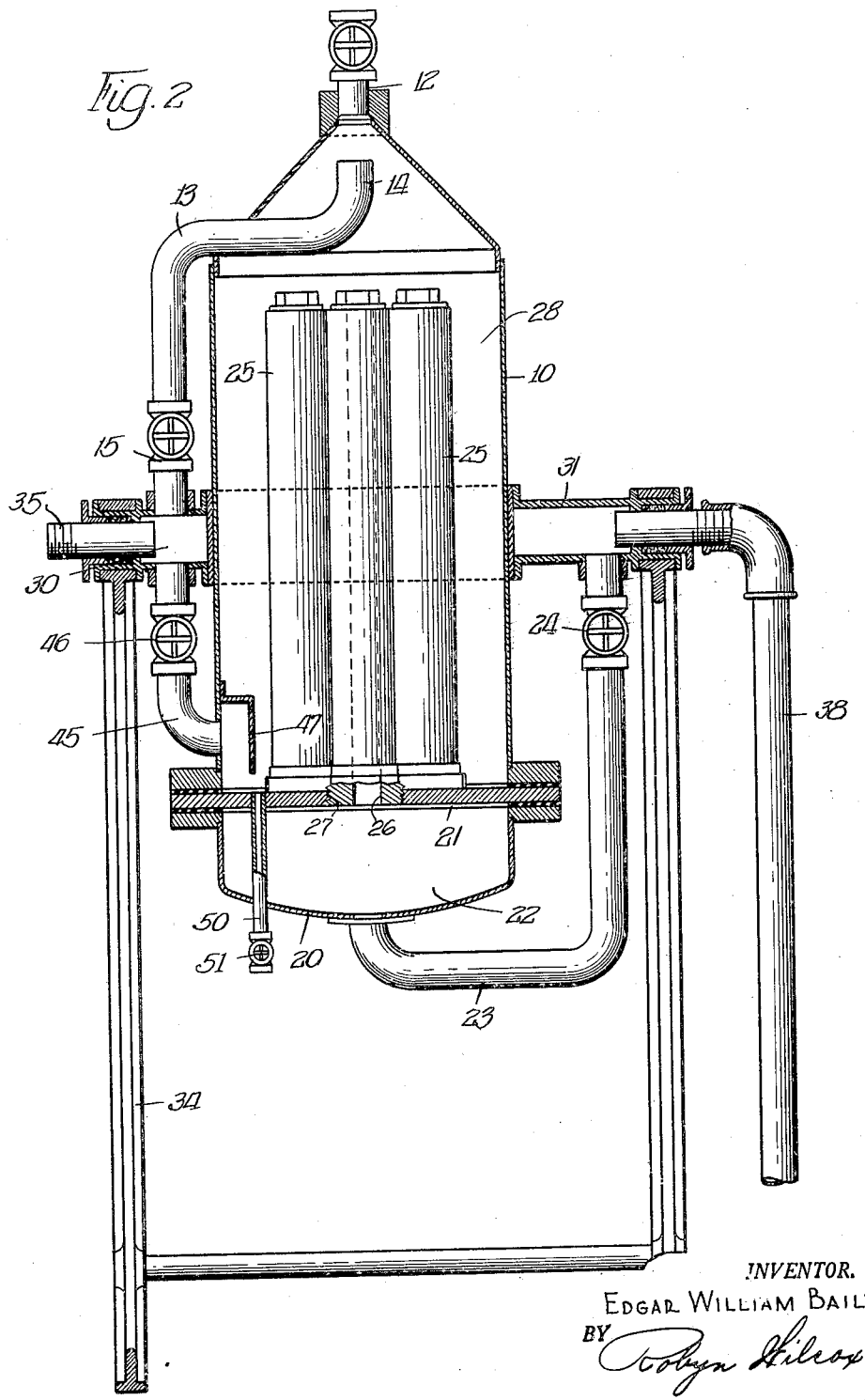

2,496,370

UNITED STATES PATENT OFFICE 2,496,370

APPARATUS FOR FILTRATION OF LIQUIDS

Edgar W. Baily, Purley, England, assignor to Paterson Engineering Company, Ltd., London, England, a corporation of Great Britain Application May 24, 1947, Serial No. 750,241
In Great Britain July 9, 1946

8 Claims. (Cl. 210—180)

1

This invention relates to filtering apparatus of the kind in which a medium such as kieselguhr, siliceous earth, or other like particulate material is deposited upon a rigid support or foundation, whether metallic or non-metallic, and consisting, for example, of a helical wire winding, multiple discs, wire mesh, a porous ceramic candle, or other support, all hereinafter referred to by the generic term "candle" or "element."

A principal object of this invention is to provide an improved filter of the type referred to, and especially a filter which avoids the loss of solution heretofore customary.

A further object of this invention is to provide a filter assembly in which the filter bed of filter aid material can be formed with an inexpensive liquid, such as water, the filter casing drained without disturbing the filter bed, and a run of valuable liquid to be filtered then introduced and passed through the preformed filtering coat.

These, and other objects will be apparent from the following specification and claims.

Filters of the type mentioned are usually of two types, one in which the candles are suspended from a division plate, or partition, which forms the bottom of the outlet, or discharge, or filtrate chamber, and the other in which the outlet chamber is at the bottom of the filter and the elements stand up from the division plate.

In the first mentioned type of filter the filter medium, such as kieselguhr, is usually mixed with some liquid and poured into the filter before starting the filtration of the main bulk of the liquid, the liquid then being fed to the filter through an inlet fitting designed to produce local turbulence and mixing with the filter medium already introduced and carrying it onto the foundation, where it is strained out and remains as a filter bed as long as the liquid continues to flow. In this type of filter the first liquid passing through the filter, i. e., that being filtered until a satisfactory coating of filter aid material is formed on the candle, must be wasted or refiltered as it will obviously be insufficiently clarified until the filter coating is properly formed.

In the second type of filter the filter bed medium is usually mixed with some other liquid than that to be filtered (e. g. water in some cases, or a thin solvent constituent of the main liquid in others) and pumped through the filter. When the bed is formed the liquid is drained out through the bed by gravity, or displaced by air pressure, leaving the filtering medium as a moist bed on the candles. The liquid to be filtered is now passed through the filter and passes through

2 the bed, without disturbing it so that filtration is perfect from the start. On completion of a filtering run the liquid can be drained out, or displaced, as before, so that there is a minimum of waste.

The filter with the suspended elements has the advantage that a used bed can be dropped and reformed or discharged by back washing, while this is difficult or impossible with a filter in which the elements have outlets into the filtrate chamber at the bottom. On the other hand, the filter with erect elements, i. e., having outlets at the bottom, enables the bed to be formed without loss of valuable liquid and also enables practically the whole of the valuable liquid to be filtered without the loss of that contained in the space surrounding the elements. This is of considerable importance in filtering substances of considerable value, such as sugar solutions, essential oils, varnishes, soft drink syrups, and the like. The removal of the used or spent bed however entails the opening up of the filter, scraping, washing, or hosing down the elements, which is inconvenient and laborious, and can be economically justified only by the fact that the liquid contained in the filter casing is of sufficient value to warrant the considerable labor expense involved.

The object of the present invention is to devise an improved form of filter of the kind referred to which will possess the advantages of the two types described above without their attendant disadvantages. Briefly, the invention comprises a filter of the kind referred to in which the filter casing is mounted on trunnions, which may be hollow and used as inlet and outlet respectively. This arrangement is such that the filter can be worked for forming the bed, and for cleaning, with the filtrate chamber uppermost, and the elements depending from the division plate. It can be inverted after forming the bed, so that the elements stand erect from the division plate, whereupon the liquid used for forming the bed can be drained out without disturbing the bed, and then followed by the liquid to be filtered. The expensive liquid being filtered can be almost completely filtered through the bed, being displaced by air, steam or other fluid if necessary, so that the filter casing is emptied without loss of valuable material. For discharging the bed from the element, the filter should be returned to the original position with the elements depending from the plate, and compressed air or other fluid under pressure then may be used to assist in throwing off the filter bed.

A further advantage of the present invention is that with my improved filter it is possible to avoid contamination of the outlet chamber and outlet pipe with the raw unfiltered liquid, which may contain bacteria and other organisms it is desired to eliminate.

The combination will be particularly useful in filtering liquids such as beer, wines, syrups, chemical solutions, varnishes, etc.

The invention will be readily understood from a consideration of the drawings in which:

Figure 1 is a vertical cross sectional view of the filter in the first position, in which the bed is ready for forming on, or removing from, the candles as desired.

Figure 2 is a vertical cross sectional view of the filter in the second position, in which the material to be filtered passes through the bed.

The filtering elements are contained in casing 10, preferably formed with a conical bottom 11. A valved sludge discharge line 12 leads from the apex of the conical bottom for the discharge of spent filtering material. An inlet 13, having a downwardly directed discharge nozzle 14 and a control valve 15, discharges into the conical portion. This construction has the advantage that a supply of filter aid material can be introduced into the casing and the inflowing liquid will suspend the same so that it will be deposited on the candles by the passage of the liquid therethrough.

At its other end the casing 10 is provided with a casing head 20. A division plate, or partition, 21 is mounted across the casing 10, as shown, and separates a filtrate, or outlet, or discharge, chamber 22 within the head 20, from an inlet, or filtering, chamber 28 on the other side of said plate 21. The effluent conduit 23, provided with a flow control valve 24, leads from the outlet chamber 22, as shown. As is customary in this type of filter the filtering elements or candles 25 are mounted on the plate 21 so as to extend into the body of the filtrate chamber 28. Each element has a passageway, such as shown at 26, extending the length thereof and discharging into the outlet chamber 22 through an opening 27 in the plate 21, arranged to register with the passageway 26, as is well known.

In the apparatus of my invention the casing 10 is supported by trunnions 30 and 31, which, preferably, are hollow, as shown. The trunnions 30 and 31 in turn are journaled in bearings 32 and 33 carried by a supporting frame 34. In my preferred construction the inlet pipe 13 is rigidly connected to the trunnion 30, as shown. Similarly the effluent conduit 23 is rigidly connected to the trunnion 31. Supply pipe 35 is rotatably connected to the trunnion 30 by a liquidtight connection, which may be of any suitable type, but for purposes of illustration is shown as comprised of a packing gland 36 held in place by a gland nut 37. The outlet pipe 38 is similarly rotatably connected to the trunnion 31, a liquidtight connection being formed by the packing gland 39 and the gland nut 40. It is thus obvious that the casing 10 may be rotated with respect to its supporting frame 34 so that either the conical hopper 11 or the discharge chamber 22 is at the bottom. Thus the candles 25 will be depending from the plate 21 or standing erect therefrom, as desired by the operator, and as illustrated in the two figures.

I also prefer to have a second inlet 45 provided with a valve 46 leading from the inlet trunnion 30 and discharging adjacent the plate 21, as shown. Across the discharge end of the second inlet 45 I place a deflecting channel or baffle 47 so arranged as to prevent liquid flowing therethrough discharging against the elements 25.

A pipe 50 provided with a valve 51 passes through the partition 21 and the casing head 20. This pipe serves several purposes: it is an air vent at the state of precoating operation; it is an air inlet when it is desired to remove the coat of filter aid material from the candles 25; and, in the second position of the filter, serves as a liquid drain from the casing.

For the purpose of describing the operation of the apparatus of my invention it will be assumed that the elements or candles 25 have been cleaned and it is desired to form a coat of filter aid material thereon. At this stage the filter is in the position shown in Figure 1, with the outlet chamber 22 at the top and the conical hopper 11 at the bottom. The filter elements are thus suspended in a dependent position from the plate 21. The second inlet valve 46 is closed while the first inlet valve 15 is open. The outlet valve 24 is also open. A slurry of filter aid material such as diatomaceous earth, or the like, suspended in an inexpensive liquid, such as water, is introduced through the inlet 13. As the liquid portion of the slurry passes through the elements 25 the filter aid material is deposited on the outside thereof, thus forming a coating, or bed, of such material on the elements. Then the liquid flows upwardly through the passageways 26 in the elements into the outlet chamber 22 and out the outlet 23, 38. The first liquid passing through the filter will not be completely clarified and will contain some turbidity until a proper coating has been formed on the elements. As soon as the coating of filter aid material is formed, the casing is rotated to the position shown in Figure 2, in which the outlet chamber 22 is at the bottom and the conical portion 11 is at the top. Inlet valve 15 is then closed. At this point the casing 10 is initially full of water. The water is then drained out of the casing, preferably by passing through the elements into the manifold 22 and is siphoned off through the outlet pipes 23, 38. It can also be drained through pipe 50, if desired. As explained more fully in my co-pending application, Serial No. 750,242, such draining does not cause the coating of filter aid material to fall from the elements 25, so that although the casing has been completely drained, the coating of filter aid material is firmly attached to the supporting elements.

The second inlet valve 46 is now opened. Then a flow of liquid to be filtered is passed into the filter, entering the filter chamber of the casing 10 at the bottom and soon filling it. The liquid passes through the coating of the elements 25 and down into the outlet chamber 22 and out through the outlets 23, 38. If it is desired to temporarily interrupt the process without reforming the bed, the valve 46 is closed and the casing is then drained by the siphon 23, 38— the valve on outlet 12 being opened slightly to permit air to enter the casing 10. Draining by this method does not cause the coating to fall from the elements so that filtering can be resumed at any time desired without the necessity of reforming the filtering coat.

When the coat has become so contaminated that it must be removed from the filter or the coating has been so compacted that it must be reformed, the filter is rotated to the original position shown in Figure 1. The drain 12 is opened and the filter coating readily falls from the elements 25. Usually it will be advisable, prior to rotating the casing from the position of Figure 2 to that of Figure 1, to drain the casing 10 of the valuable liquid being filtered and to then pass enough water through the elements to fill the chamber 22. Then, when the drain 12 is opened, the backflow of water through the elements 25 will easily wash the filter aid material from the elements and out the drain 12. A new coating can then be formed as above described.

It is obvious that my invention can take a variety of forms as I have shown a preferred form only.

I claim:

1. A filter of the type described comprising a rotatably mounted filter casing, a partition in said casing forming an outlet chamber at one end thereof, and a filter chamber at the other end thereof and a constantly open passageway between said chambers, a solids outlet from said filter chamber, a filter element mounted on said partition and so positioned as to discharge through said passageway into said outlet chamber, a supply inlet associated with said casing, a conduit leading from said supply inlet and discharging into said filter chamber adjacent to said solids outlet, a second conduit leading from said supply inlet into said filter chamber and discharging adjacent said partition, and an outlet from said outlet chamber.

2. A filter of the type described comprising a casing, hollow trunnions mounted on said casing to support the same, bearings rotatably supporting said trunnions, a partition in said casing dividing it into an outlet chamber and a filter, passageways through said partition, an outlet from said outlet chamber into one of said trunnions, a supply conduit into the other of said trunnions, divided inlets leading from said last mentioned trunnion into said filter chamber, one discharging therein adjacent said partition and the other discharging at the opposite end of said filter chamber, valves on said divided inlets, and filter elements in said filter chamber mounted on said partition and communicating with said outlet chamber through said passageways.

3. A filter of the type described comprising a vertically extending casing, trunnions so mounted on said casing as to permit rotation of the same about a horizontal axis, a horizontal partition in said casing dividing it into a filtrate outlet chamber and a filter chamber, an outlet from said filtrate outlet chamber, divided inlets leading into said filter chamber, one discharging therein adjacent said partition and the other discharging at the opposite end of said filter chamber, valves on said divided inlets, vertical liquid pervious filter elements in said filter chamber mounted on said horizontal partition, and a port through said partition for each of said filter elements and registering therewith, said elements and said ports affording communication from said filter chamber to said filtrate chamber.

4. In combination with a filter comprising a casing, a supply inlet leading into said casing and discharging into one end portion of said casing, a waste outlet leading from said end portion, a filtrate outlet leading from the opposite end portion of said casing, a partition interposed between said inlet and said filtrate outlet and forming in said casing an outlet chamber adjacent said filtrate outlet and a filter chamber adjacent said inlet, a plurality of passageways through said partition, and permeable hollow filter elements mounted in said filter chamber and discharging through said passageways into said filtrate outlet chamber; a stationary frame, supporting means mounted on said casing and rotatably supported by said frame, said supporting means being mounted on an axis perpendicular to the axis of said filter elements and said casing; and a branch inlet leading from said supply inlet and discharging adjacent said partition.

5. A filter of the type described, comprising a vertically extending filter casing, a horizontal plate extending across said casing and forming therein a filter chamber and a filtrate chamber, a port through said plate, a vertically extending filter element mounted on said plate and extending in said filter chamber, said filter element registering with said port and having a passageway therein for discharging filtered liquid therethrough, rotatable supporting means for said casing so constructed and arranged that said casing may be turned around a horizontal axis from a position where said filter element extends vertically downwardly from said plate for coating with a filter aid material, or for removing filter aid material therefrom, to a position where it extends vertically upwardly therefrom during the filtering operation, and means for discharging incoming liquid in the lower portion of the filter chamber in each of said positions of the casing, said means including a first inlet for incoming liquid discharging into said filter chamber adjacent said plate, a second inlet for incoming liquid discharging into said filter chamber adjacent the end opposite said plate, valves on said inlets, and means for draining said casing in either of said positions, said means including conduits from the vertically opposed ends of said casing.

6. In a filter of the type described comprising a filter casing, a partition in said casing dividing said casing into an inlet chamber and an outlet chamber, a filtrate outlet from said outlet chamber, a solids outlet from said inlet chamber, a port in said partition, a filter element mounted on said partition and having a passageway extending therealong and registering with said port in said partition to discharge into said outlet chamber through said port, and a supply conduit associated with said casing, the improvement characterized by a first inlet conduit leading from said supply conduit and discharging in said inlet chamber adjacent to said solids outlet, a second inlet conduit leading from said supply conduit and discharging in said inlet chamber adjacent to said partition, and rotatable supporting means mounted on said casing in such manner that said casing may be rotated 180°, whereby the filter may be used in one position during the forming and removing of a filter coat and may be used in a vertically reversed position during filtering.

7. In a filter of the class described, a hollow casing having a partition therein dividing said casing into an inlet chamber and an outlet chamber, a filtrate outlet from the end of said outlet chamber, a sludge outlet from the other end of said casing, a filter element mounted on and extending from said partition into said inlet chamber and being in a generally vertical position during operation of the filter, a passageway through said filter element leading to said outlet chamber, for discharging filtered liquid to said outlet chamber; the improvement characterized by a support frame, a pivotal mounting for said casing on said support frame, mounting said casing for turning movement about an axis transverse to the longitudinal axis of said casing, to permit said casing to be positioned with said filtrate outlet depending therefrom during the filtering operation, and to be positioned with said sludge outlet depending therefrom during the coating of said filter with a filter aid material and during removal of filter material therefrom, liquid inlets into opposite ends of said inlet chamber, valve means selectively operable to control the admission of liquid to either end of said inlet chamber, and a common inlet arranged coaxial with the axis of turning movement of said casing for supplying liquid to said inlets in either position of adjustment of said casing.

8. In a filter of the class described, a hollow casing having a partition therein dividing said casing into an inlet chamber and an outlet chamber, a filtrate outlet from said outlet chamber, a sludge outlet from the end of said inlet chamber, a filter element mounted on and extending from said partition into said inlet chamber and being in a generally vertical position during operation of the filter, a passageway through said filter element leading to said outlet chamber, for discharging filtered liquid to said outlet chamber; liquid inlets into opposite ends of said inlet chamber, valve means selectively operable to control the admission of liquid through either of said liquid inlets to either end of said inlet chamber, hollow trunnions extending outwardly from opposite sides of said casing intermediate the ends thereof and a frame member having said trunnions journaled thereon and forming a support means for said casing and mounting said casing for turning movement to position said filtrate outlet to depend therefrom in one position of such casing, thereby permitting complete draining of said casing after the coating and prior to the filtering operation, and to position said sludge outlet to depend therefrom in another position of said casing, thereby permitting discharge of filter material after back-washing and prior to coating, a liquid conducting connection from said filtrate outlet to the hollow inside of one of said trunnions and a common liquid conducting connection from said inlets to the other of said trunnions, whereby liquid may be conducted to said inlets and from said outlet in all positions of adjustment of said casing with respect to said frame.

EDGAR W. BAILY.

REFERENCES CITED

The following references are of record in the file of this patent:

UNITED STATES PATENTS

| Number | Name | Date |
|---|---|---|
| 376,095 | Hyatt | Jan. 10, 1888 |
| 517,240 | Roger | Mar. 27, 1894 |
| 726,427 | Hausserman | Apr. 28, 1903 |
| 1,992,101 | Stuart | Feb. 19, 1935 |
| 2,300,849 | Tauch | Nov. 3, 1942 |
| 2,423,172 | Booth | July 1, 1947 |

FOREIGN PATENTS

| Number | Country | Date |
|---|---|---|
| 458,997 | Germany | of 1928 |

Certificate of Correction

Patent No. 2,496,370 February 7, 1950

EDGAR W. BAILY

It is hereby certified that errors appear in the printed specification of the above numbered patent requiring correction as follows:

Column 3, line 42, for the word "filtrate" read *filter*; column 5, line 37, after "filter" and before the comma insert *chamber*;

and that the said Letters Patent should be read with these corrections therein that the same may conform to the record of the case in the Patent Office.

Signed and sealed this 30th day of May, A. D. 1950.

[SEAL]

THOMAS F. MURPHY,
*Assistant Commissioner of Patents.*